(12) United States Patent
Song (10) Patent No.: US 9,832,060 B2
(45) Date of Patent: Nov. 28, 2017

(54) METHOD AND CIRCUIT FOR FAST FOURIER TRANSFORM

(71) Applicant: Montage Technology (Shanghai) Co., Ltd., Shanghai (CN)

(72) Inventor: Heming Song, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 369 days.

(21) Appl. No.: 14/679,014

(22) Filed: Apr. 5, 2015

(65) Prior Publication Data

US 2016/0226695 A1 Aug. 4, 2016

(30) Foreign Application Priority Data

Feb. 3, 2015 (CN) .......................... 2015 1 0056889

(51) Int. Cl.
*H04L 27/26* (2006.01)
*G06F 17/14* (2006.01)

(52) U.S. Cl.
CPC ........ *H04L 27/2636* (2013.01); *G06F 17/142* (2013.01); *H04L 27/263* (2013.01)

(58) Field of Classification Search
CPC .......................... H04L 27/2636; H04L 27/263
See application file for complete search history.

(56) References Cited

U.S. PATENT DOCUMENTS

| 5,987,005 A * | 11/1999 | Fertner | G06F 17/142 370/203 |
| 2009/0228766 A1* | 9/2009 | Djordjevic | H03M 13/1102 714/780 |
| 2010/0197237 A1* | 8/2010 | Xu | H04L 25/0228 455/67.11 |
| 2013/0176991 A1* | 7/2013 | Yi | H04J 11/0076 370/336 |

* cited by examiner

*Primary Examiner* — Gbemileke J Onamuti
(74) *Attorney, Agent, or Firm* — Oliff PLC (57) ABSTRACT

A method for FFT/IFFT computation, comprising: identifying whether grouping data is needed based on data bitwidth distribution in a set of data, wherein the set of data includes data in a stage of a FFT/IFFT computation; assigning different data representations including effective bit and group index for data identified in different groups if grouping is needed, wherein data in a group have same exponent, and data in different groups have different exponents; and outputting a signal indicating the exponent; for each of a plurality of short sequence FFT/IFFT computation—decomposing data used in present short sequence FFT/IFFT computation into at least a first multi-bit part and a second multi-bit part; respectively calculating FFT/IFFT computation results for the first multi-bit part and the second multi-bit part; adding the FFT/IFFT computation results for the first and the second multi-bit part; scanning a plurality of short sequence FFT/IFFT computation added results.

30 Claims, 5 Drawing Sheets

METHOD AND CIRCUIT FOR FAST FOURIER TRANSFORM

CROSS REFERENCE TO RELATED APPLICATION

This application claims priority to Chinese application No. 201510056889.X entitled "method and circuit for Fast Fourier Transform," filed on Feb. 3, 2015 by Montage Technology (Shanghai) Co., Ltd., which is incorporated herein by reference.

TECHNICAL FIELD

The present invention relates to data transform, and more particularly, but not limited to method and circuit for Fast Fourier Transform.

BACKGROUND

Fast Fourier Transform or Inverse Fast Fourier Transform (FFT/IFFT) computation satisfies Parseval's theorem, that is, the energy of the output data is N times of the energy of input data. That means, for lossless computation, it needs a large storage space, and a computation unit also needs a large bitwidth. In order to conserve resources, a conventional method comprises scanning the maximum value of the overall data, and determining a constant of powers of 2 with which the overall data is multiplied or divided to save an effective data with less bitwidth, and compensating the same factor on the final iteration result, after completion of each of iterations. This conventional method is called automatic gain. However, the above algorithm has an accuracy issue, especially when the data distribution is uneven, which causes the computation accuracy to decrease dramatically. The reason is that, when the dynamic range of data is larger than the data bitwidth, in order to represent the maximum value, all the data are scaled, which may cause the complete loss of smaller data. Therefore it is desirable to have a method and device that may solve the above problem.

SUMMARY

An embodiment of the invention discloses a method for Fast Fourier Transform/Inverse Fast Fourier Transform (FFT/IFFT) computation, comprising: identifying whether grouping data is needed based on data bitwidth distribution in a set of data, wherein the set of data includes data in a stage of a FFT/IFFT computation; assigning different data representations including effective bit and group index for data identified in different groups, if grouping the data is needed, wherein data in a group have same exponent, and data in different groups have different exponents; and outputting a signal indicating the exponent; for each of a plurality of short sequence FFT/IFFT computation—decomposing data used in present short sequence FFT/IFFT computation into at least a first multi-bit part and a second multi-bit part, with the first multi-bit part higher than the second multi-bit; respectively calculating FFT/IFFT computation results for the first multi-bit part and the second multi-bit part; adding the FFT/IFFT computation results for the first multi-bit part and the second multi-bit part; scanning a plurality of short sequence FFT/IFFT computation added results, wherein the plurality of short sequence FFT/IFFT computation comprises FFT/IFFT computation in a stage.

Another embodiment of the invention discloses a circuit for Fast Fourier Transform/Inverse Fast Fourier Transform (FFT/IFFT) computation, comprising: a controller configured to identify whether grouping data is needed based on data bitwidth distribution in a set of data, wherein the set of data includes data in a stage of a FFT/IFFT computation; assigning different data representations including effective bit and group index for data identified in different groups, if grouping the data is needed, wherein data in a group have same exponent, and data in different groups have different exponents; and outputting unit, configured to output a signal indicating the exponent; for each of a plurality of short sequence FFT/IFFT computation—a decomposing unit configured to decompose data used in present short sequence FFT/IFFT computation into at least a first multi-bit part and a second multi-bit part, with the first multi-bit part higher than the second multi-bit; a FFT/IFFT computation unit, configured to respectively calculate FFT/IFFT computation results for the first multi-bit part and the second multi-bit part; an adder configured to add the FFT/IFFT computation results for the first multi-bit part and the second multi-bit part; a scanner, configured to scan a plurality of added short sequence FFT/IFFT computation results, wherein the plurality of short sequence FFT/IFFT computation comprises FFT/IFFT computation in a stage.

Another embodiment of the invention discloses a signal generator, including the above circuit.

Another embodiment of the invention discloses a receiver including the above circuit.

DESCRIPTION OF THE DRAWINGS

The present invention is illustrated in an exemplary manner by the accompanying drawings. The drawings should be understood as exemplary rather than limiting, as the scope of the invention is defined by the claims. In the drawings, the identical reference signs represent the same elements.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

Figure 1:
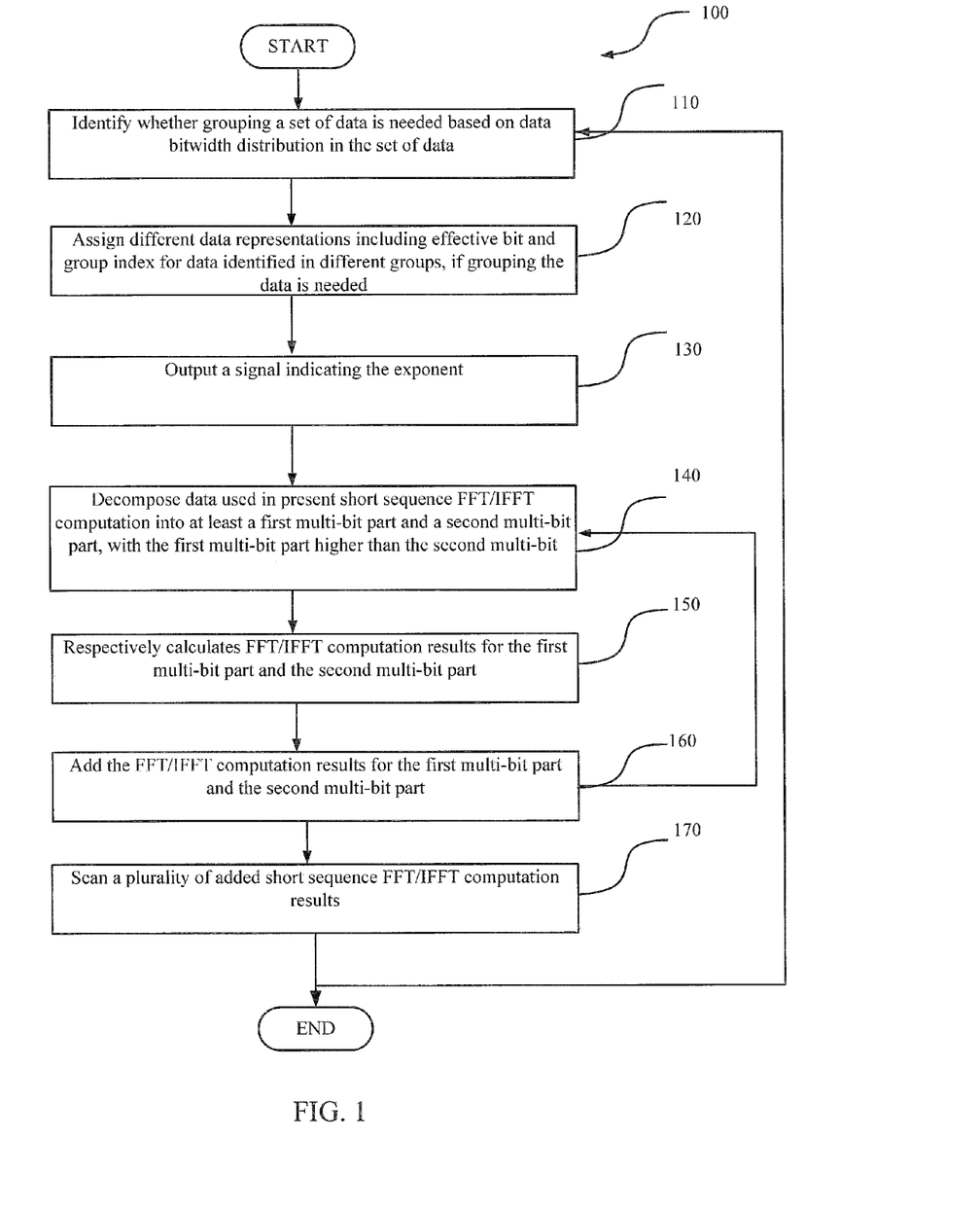
FIG. 1 is a flow chart illustrating a method according to an embodiment of the invention.

FIG. 1 is a flow chart illustrating a method 100 according to an embodiment of the invention. First, the method 100 comprises block 110, identifying whether grouping a set of data is needed based on data bitwidth distribution in the set of data. Wherein the set of data includes data in a stage of a FFT/IFFT computation.

To be specific, a scanner, such as the scanner 460 discussed further below in conjunction with FIG. 4, obtains the data distribution of the overall data in a stage of FFT/IFFT computation according to the scanned result. Taken a case that a maximum allowed group number is two as an example, a controller, such as the controller 410 discussed further below in conjunction with FIG. 4, sequentially adds the number of data by descending order of bitwidth size according to data distribution. If the added number exceeds a threshold, it means that grouping is needed. The bitwidth when exceeding the threshold represents the minimum bitwidth for the first group. For example, in an embodiment, the predetermined threshold can be set to m.

TABLE 1

| Data bitwidth | Number of Data | AGC gain 1 | AGC gain 2 |
|---|---|---|---|
| Ns + 7 bit | M7 | $2^{\hat{}} - x$, | $2^{\hat{}} - x$, |
| Ns + 6 bit | M6 | and Mx > 0, | and |
| Ns + 5 bit | M5 | ΣMp = 0, p > x | ΣMp >= threshold1, |
| Ns + 4 bit | M4 | | p >= x. |
| Ns + 3 bit | M3 | | and |
| Ns + 2 bit | M2 | | ΣMp < threshold1, |
| Ns + 1 bit | M1 | | p > x |
| <=Ns bit | M0 | | |

Ns in table 1 represents input bitwidth of the computation unit. Ns+xbit (x=1, 2, . . . ) represents bitwidth distribution of overall data after scan of previous stage. Mx represents the number of data in the corresponding bitwidth. Table 1 enumerates the data distribution after a stage of Discrete Fourier Transform (DFT) computation. Controller selects rows of the table according to length of DFT, possible range of data, or implementation details from the data distribution table. In conventional solution (control group, represented as AGC gain 1), the Automatic Gain Controller (AGC) will determine which bitwidth the maximum value is located, and adjust the AGC gain, so that the bitwidth of the maximum value is adjusted to Ns bit (Ns is the input bitwidth of the computation unit). As shown in AGC1 result in table 1, the AGC gain is $2^{\hat{}}-x$, when a number of data with bitwidth of Ns +x is not 0, namely, M (Ns+x)>0, and data with bitwidth of greater than Ns+x is 0, namely ΣM (Ns+x)=0, p>x.

The method according to an embodiment of the invention is not based on the maximum value of the overall data, but a maximum value in a group for AGC instead. The gain selected by AGC is not necessarily a maximum value, but rather a value that number of data which are greater than the bit is less than a threshold, and the next gain level will cause the number of data greater than the gain bit to be greater than the threshold. As such, the gain is dependent on the maximum value of each group of data. As shown in AGC2 in table 1, the AGC gain is $2^{\hat{}}-x$, when the number of data with bitwidth greater than or equal to the Ns+x is greater than threshold 1, namely ΣM (Ns+x)>=threshold 1, p>=x, and the number of data with bitwidth greater than Ns+x is smaller than threshold 1, namely ΣM (Ns+x)<threshold 1, p>x.

Embodiment 1

For example, bitwidth Ns of the FFT/IFFT calculator is 12 bits. Data size (also bitwidth) used for results of one stage of calculation is 15 bits (Ns+3 bits), 14 bits, 13 bits and 12 bits or less. The number of data with bitwidth of 15 is 2, namely M3=2. The number of data with bitwidth of 14 (Ns+2 bits) is 3, namely M2=3. The number of data with bitwidth of 13 (Ns+1 bits) is 23, namely M1=23. Number of data with Ns bits or less(≤), including 10 bits, 8 bits, 6 bits, 3 bits, is M0=100. Setting a threshold value to 10. According to data distribution, the number of data with bitwidth of more than 13 bits is 5, while the number of data with bitwidth of equal to or more than 13 bits is 28. As the threshold is 10, the number of data with bitwidth of more than 13 is smaller than the threshold of 10, while the number of data with bitwidth of equal to or more than the threshold of 13. According to table 1, x=1, and the corresponding gain is $2^{-1}$.

Embodiment 2

The threshold is still taken as 10. In another embodiment, bitwidth Ns of the FFT/IFFT calculator is still 12 bits. Data size (also bitwidth) used for results of one stage of calculation is 15 bits (Ns+3 bits), 14 bits, 13 bits and 12 bits or less. The number of data with bitwidth of 15 is 18, namely M3=18. The number of data with bitwidth of 14 (Ns+2 bits) is 3, namely M2=3. The number of data with bitwidth of 13 (Ns+1 bits) is 23, namely M1=23. Number of data with Ns bits or less(≤), including 10 bits, 8 bits, 6 bits, 3 bits, is M0=84. Since the number of data with any bitwidth is larger than the threshold 10, that is the data is distributed in uniformity. Therefore, there is no need to group the data. The gain is in consistency with the conventional method, that is, $2^{-3}$.

In summary, it can be noted that when data is uniform, data located in the maximum bitwidth will be quite a lot, which is generally more than the set threshold, therefore the control group of AGC gain 1 will have the same AGC gain as the AGO gain 2 of an embodiment of the invention. The calculation process is exactly the same, and the results are identical, which both have a high signal to noise ratio (SNR). When the data changes in a large scale, that is when the data is not sufficiently even, AGO will not generate negative gain because of a small group of data, which leads to a loss of overall performance. Therefore threshold1 can adjust precision. Generally a reference to about 2 percent of the entire length of FFT sequence may result in a good performance gain.

A solution of the embodiment 1 described above is actually to divide the data into two groups. Those skilled in the art should appreciate that, in accordance with the embodiments of present invention, a plurality of groups may be provided, and each group is provided with an additional AGC, that is each group has its own AGC parameters. Not only the data which are larger than the input bitwidth of the calculation unit can be grouped, but also the data which are smaller than the input bitwidth of the calculation unit can be grouped, while assigning positive AGC gain. Such supplementary solution may further improve the accuracy, and simplify the calculation.

After grouping, corresponding storage space needs to be allocated to indicate the grouping conditions. In the case of a fixed memory size, the group index can be indicated without increasing the memory or impact data precision. For example, the original data is represented in 16 bitwidth. When the group index needs to be added, data in a lower group (mainly includes data with lower bits) may use their redundant higher bits to represent the group index. The other groups of data may discard its lowest bit to satisfy the storage conditions. Those of ordinary skill in the art can understand that when the other groups of data discard their lowest bit, it is natural that the higher bit will be redundant, therefore having a consistent form with the other groups. Of course, the controller knows how groups are represented in advance. For example, how many bits are used to represent groups; whether the group index occupies the most significant bit or the least significant bit if there is a group index. When group index are used, different group index representations use same representing rules.

When space has been allocated to indicate grouping condition, the bitwidth originally used to represent data is reduced, which means a loss of precision. However, he loss may be small. In addition, alternatively, additional space may be allocated for group index. Data in different group use different exponent.

Then, in block 120, the method assigns different data representations including effective bit and group index for data identified in different groups, if grouping the data is needed. Wherein data in a group have same exponent, and data in different groups have different exponents.

Referring to embodiment 1, which has two groups. The index for the first group is $2^3$, and the index of the second group is $2^1$, i.e. 2.

In block 130, the method outputs a signal indicating the exponent. Alternatively, when the method needs to group data, at least one bit is output to indicate group index, wherein the group index represents the exponent used by the group. In general, group index corresponds to the exponent used by the group in a one-to-one manner. Alternatively, based on the number of groups, the number of bits required to represent the group index can be determined. Still taken embodiment 1 as an example, when the data may be divided into maximum two groups, one bit is needed to represent which group the data is in. For example, 0 indicates the first group, and 1 represents the second group. When the data are divided into four groups, two bits are needed to represent which group the data are in. For example, 0 indicates the first group, 1 indicates the second group, 2 indicates the third group, and 3 indicates the fourth group, and so on.

Group index, that is, the index of exponent, is dynamic. The maximum bits of the group index depend on the allowed maximum number of groups of data. In actual operation, if four groups are allowed to be divided, the method may assign two bits of storage space to store the group index in one stage. Sometimes it may not satisfy the grouping condition, the method simply assigns one bit or does not allocate any bit at all. As to how to allocate position, the method may be arbitrary. For example, the memory allocates corresponding memory space to store the group index according to grouping situation, and the other space is used to store data.

The method 100 further comprises for each of a plurality of short sequence FFT/IFFT computation, in block 140, decomposing data used in present short sequence FFT/IFFT computation into at least a first multi-bit part and a second multi-bit part, with the first multi-bit part higher than the second multi-bit. For example, the first multi-bit part is a higher-bit part, and the second multi-bit part is a lower-bit part.

Alternatively, decomposing the data used in present short sequence FFT/IFFT computation into the at least first multi-bit part and the second multi-bit part is implemented according to the equation $D=A*2^k+B$, wherein A represents the first multi-bit part, B represents the second multi-bit part, and k represents the power of the first multi-bit part. Taken butterfly computation as an example, the data used in present short sequence FFT/IFFT computation represents the data used in current butterfly computation. Those of ordinary skill in the art will appreciate that, the size of the two parts of the decomposition may be different, depending on the specific design. A simple method is that the size of the two parts are fixed and of equal length. Optionally, each stage has a variable length, for example, current stage has a size longer than the previous stage.

In the above-described embodiment, data used for the current calculation are linearly decomposed into two parts. Alternatively, data used for the current calculation can be divided into three parts, four parts and so on. Each part is calculated separately, such as butterfly computation, then the calculation results are added. Noted the number of parts that are decomposed is not limited.

In the above embodiment, determination is not required prior to decomposition, the method directly enters the decomposition operation. Therefore every butterfly operation consumes double amount of time compared with the operation in which determination is performed prior to decomposition.

Alternatively, before the method performs the operation of block 140, the method further comprises determining whether the data used in the present short sequence FFT/IFFT computation needs to be decomposed by determining whether the data in the present FFT/IFFT computation use same exponent. With the determination, most data do not required decomposition. Then the computation time is substantially the same as the conventional algorithm. A small amount of decomposition increases only a small amount of the computation time.

In block 150, the method respectively calculates FFT/IFFT computation results for the first multi-bit part and the second multi-bit part.

Alternatively, the method respectively calculates FFT/IFFT computation result for the first multi-bit part and the second multi-bit further by reusing a same FFT/IFFT computation unit. For example, the method first uses the FFT/IFFT computation unit to calculate the result for the first multi-bit part, then uses the same FFT/IFFT computation unit to calculate the result for the second multi-bit part. Alternatively, the method first uses the FFT/IFFT computation unit to calculate the result for the second multi-bit part, then uses the same FFT/IFFT computation unit to calculate the result for the first multi-bit part. Only one clock cycle is added without amendment to the hardware of FFT/IFFT computation unit.

In block 160, the method adds the FFT/IFFT computation results for the first multi-bit part and the second multi-bit part. Alternatively, adding the FFT/IFFT computation results for the first multi-bit part and the second multi-bit part is implemented by using the equation $D'=A'*2^k+B'$, wherein A' represents the FFT/IFFT computation results for the first multi-bit part, and B' represents the FFT/IFFT computation results for the second multi-bit part, and k represents the power of the first multi-bit part.

Then the method repeats the operations in blocks 140, 150 and 160, until all the data in one stage have completed butterfly computation (including decomposition and adding operation). Generally, since there is only one computation unit, multiple butterfly computation are performed in sequence.

Then in block 170, the method scans a plurality of added short sequence FFT/IFFT computation results, wherein the plurality of short sequence FFT/IFFT computation comprises FFT/IFFT computation in a stage.

In one embodiment, the method iteratively performs the following items, until all stages of FFT/IFFT computation results have been completed: in block 110, the method identifies whether grouping data is needed based on data bitwidth distribution in the set of data, wherein the set of data includes data in a stage of a FFT/IFFT computation; in block 120, the method assigns different data representations including effective bit and group index for data identified in different groups, if grouping the data is needed, wherein data in a group have same exponent, and data in different groups have different exponents; and in block 130, the method outputs a signal indicating the exponent.

For each of a plurality of short sequence FFT/IFFT computation, in block 140, the method decomposes data used in present short sequence FFT/IFFT computation into at least a first multi-bit part and a second multi-bit part, with the first multi-bit part higher than the second multi-bit; in block 150, the method respectively calculates FFT/IFFT computation results for the first multi-bit part and the second multi-bit part; in block 160, the method adds the FFT/IFFT computation results for the first multi-bit part and the second multi-bit part; in block 170 the method scans a plurality of added short sequence FFT/IFFT computation results, wherein the plurality of short sequence FFT/IFFT computation comprises FFT/IFFT computation in a stage.

According to an embodiment of the invention, the data representation method uses at least two common exponents to represent data. To be specific, the data is divided into a plurality of groups, and each group share an exponent. The number of groups is larger than 1 and smaller than N (N is the FFT size). The implementation uses the basic properties of linear systems, and decomposes the input data into the computation unit linearly into two distinct parts. Each part is respectively subject to FFT/IFFT calculation, and then the results are summed. This structure has the advantage that each data has its own index bit, so the dynamic range between the groups of data are not relevant, and also has lower complexity.

Figure 2:
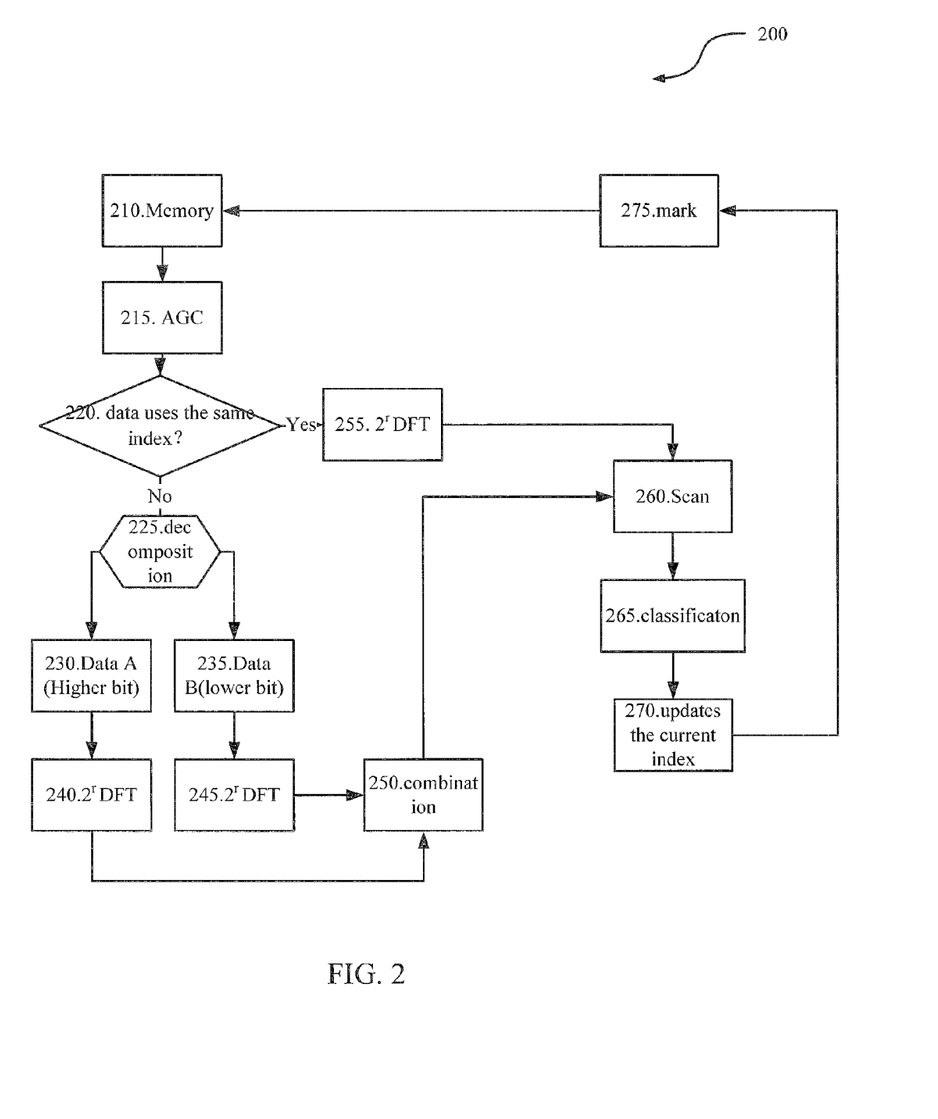
FIG. 2 is a flow chart illustrating a method according to another embodiment of the invention.

FIG. 2 is a flow chart illustrating a method according to embodiment of the present invention. The method 200 includes, first, in block 210, stores the data in the memory. Then, in block 215, the controller performs automatic gain control. In particular, in block 220, the controller determines whether the data involved in a stage of computation uses the same index. If so, the method proceeds to block 255, the method performs $2^r$ DFT, i.e. r-based (radix) DFT calculations. If the determination result of block 220 is NO, the method proceeds to block 225, that is, data decomposition. In an example when data are decomposed into two parts, namely block 230, data A representing the first multi-bit part, and block 235, data B representing the second multi-bit part. The two parts are respectively subject to $2^r$ DFT calculation in block 240 and block 245. Then in block 250, the DFT calculation results of the two parts are combined, that is, the calculation results for data A is concatenated with the calculation results for data B. Then in block 260, all the calculation results for one stage are scanned, including those from block 250 that are through decomposition and combination and those from block 255 which are not subject to decomposition, or all those from block 255 which are not subject to decomposition, to determine the data distribution of all data in one stage after the calculation. Then in block 265 the method classifies the scanning results, for example, determines the new gain value, and whether grouping is needed. If grouping is needed, how to define the boundaries of different groups. Then, in block 270, the method updates the current index. Then, in block 275, the method updates the index, e.g., marking which group the data belongs to.

Specifically, input port for 2rDFT computation unit has n bits, and output port has n+r bits. FIG. 2 shows the algorithm flowchart for each stage. In block 210, data is obtained from memory, and goes through the scaling operation by the automatic gain controller (AGC). Note AGC will not scale all the data to n bit, instead it allows some data to be larger than n bit.

In block 255, before the data enter computation unit, the method needs to proceeds with a determination of whether the data for computation has same exponent. If the data involved in computation have the same index, the data can directly enter the calculation units for calculation, and the output result is n+r bits. If the data involved in computing indices are different, then after the data are expanded into a fixed-point number, some data are found to have a bit-width of q bit, and q>n. In block 225, the function of the dividing unit is to divide a data with bitwidth of q into two n-bit data A and B. Suppose the bitwidth of data C is q, q>n, C will be decomposed into A and B of both n bits, $C = A \times 2^m + B$.

Then, the decomposed data are separately exposed to DFT calculation, which are respectively shown in blocks 240 and 245. In addition, the specific details will be discussed in reference to FIG. 3.

Since DFT is a linear operation, which satisfies Additivity and Homogeneity, the above transformations are strictly true. During implementation, the computation unit can be reused, i.e., although blocks 240, 245 and 255 are respectively used to represent the DFT calculation by the calculation units in FIG. 2, in a practical application, the above different blocks 240, 245 and 255 can reuse the same DFT calculation unit.

In block 260, the method scans output data of the DFT calculation. In block 260, the method mainly records changes of data after a stage of iteration. The embodiments of the present invention calculate data with different bitwidth using a calculation unit, i.e., n bit can represent the number of data with sign bit of no more than one bit.

Data Representation and Common Exponent

The number of groups in the embodiments of the present invention requires the same number of common exponent. How to represent which index corresponds to what data is an important issue. Index used for indicating the exponent is dependent on the number of groups. The solution uses reduced length for fixed-point to store the index bits. If there are two groups, the length of the fixed-point is k−1 bit, and 1 bit is used to store which common index the data is corresponding to. The reduction of 1 bit will not have much impact on accuracy. For uniformly distributed data, there is no need for grouping, the accuracy is still k bit. If group exists, it means the data is unevenly distributed, and the smaller data itself cannot take advantage of every bit. Further, a large amount of data may be relatively small, which have free bits. A large number of free bits can be used, and only larger data may be impacted. However, the impact on a data with great energy by its LSB (least significant bit) is minimal. Therefore such method will not degrade the performance.

Figure 3:
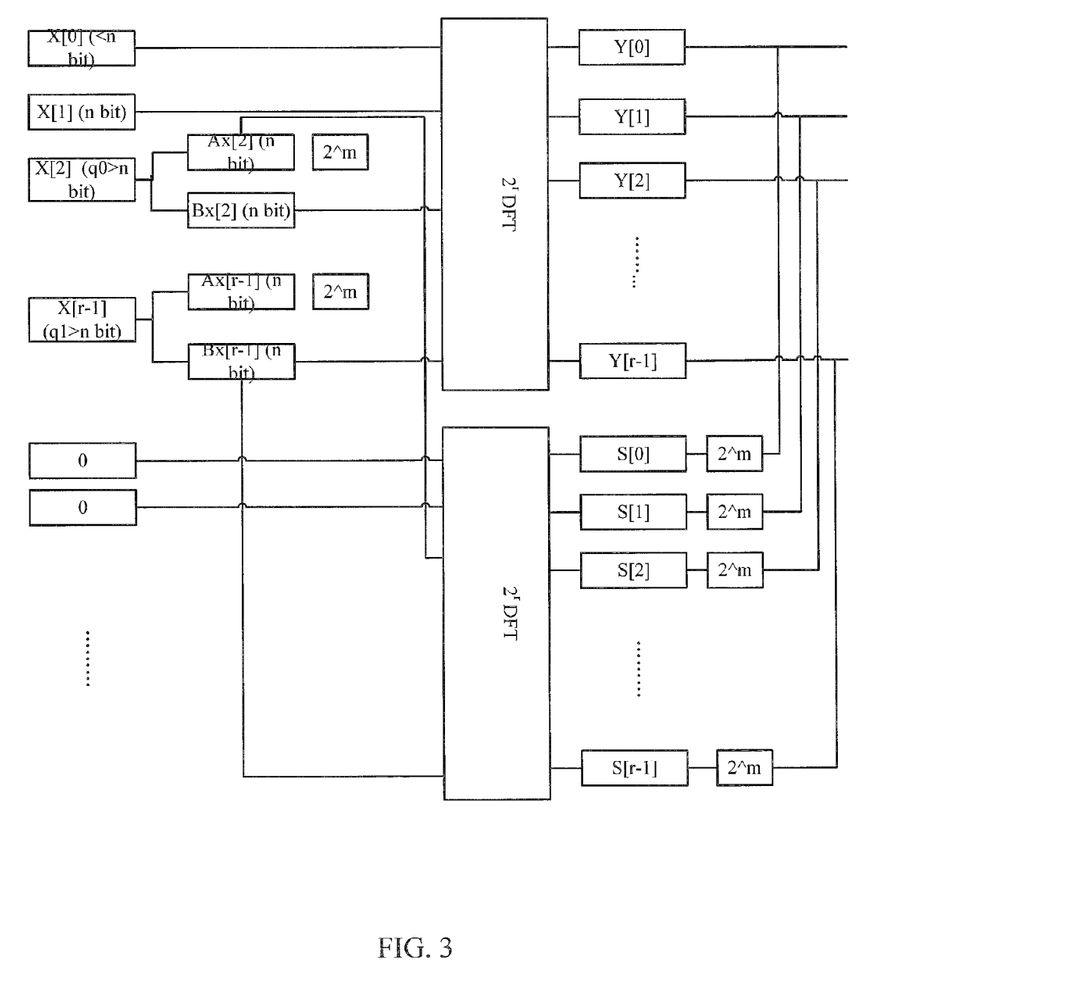
FIG. 3 is a flow chart illustrating a method according to another embodiment of the invention.

FIG. 3 is a flow chart illustrates a method according to another embodiment of the present invention. FIG. 3 shows a specific process for DFT calculation. Sequences X [0], X [1], . . . and X [r−1] are the short sequences that need DFT operation. Y [0], Y [1], Y [2] . . . and Y [r−1] are the result of DFT calculations. As shown in FIG. 3, the sequences X [2] and X [r−1] need to be grouped, while sequences X [0] and X [1] do not need to be grouped. 0 indicates the redundant bit. FIG. 3 illustrates an algorithm flowchart of an embodiment of the present invention. In FIG. 3, m represents the same variable value as represented by k in equations $D = A \times 2^k + B$ and $D' = A' \times 2^k + B'$.

Figure 4:
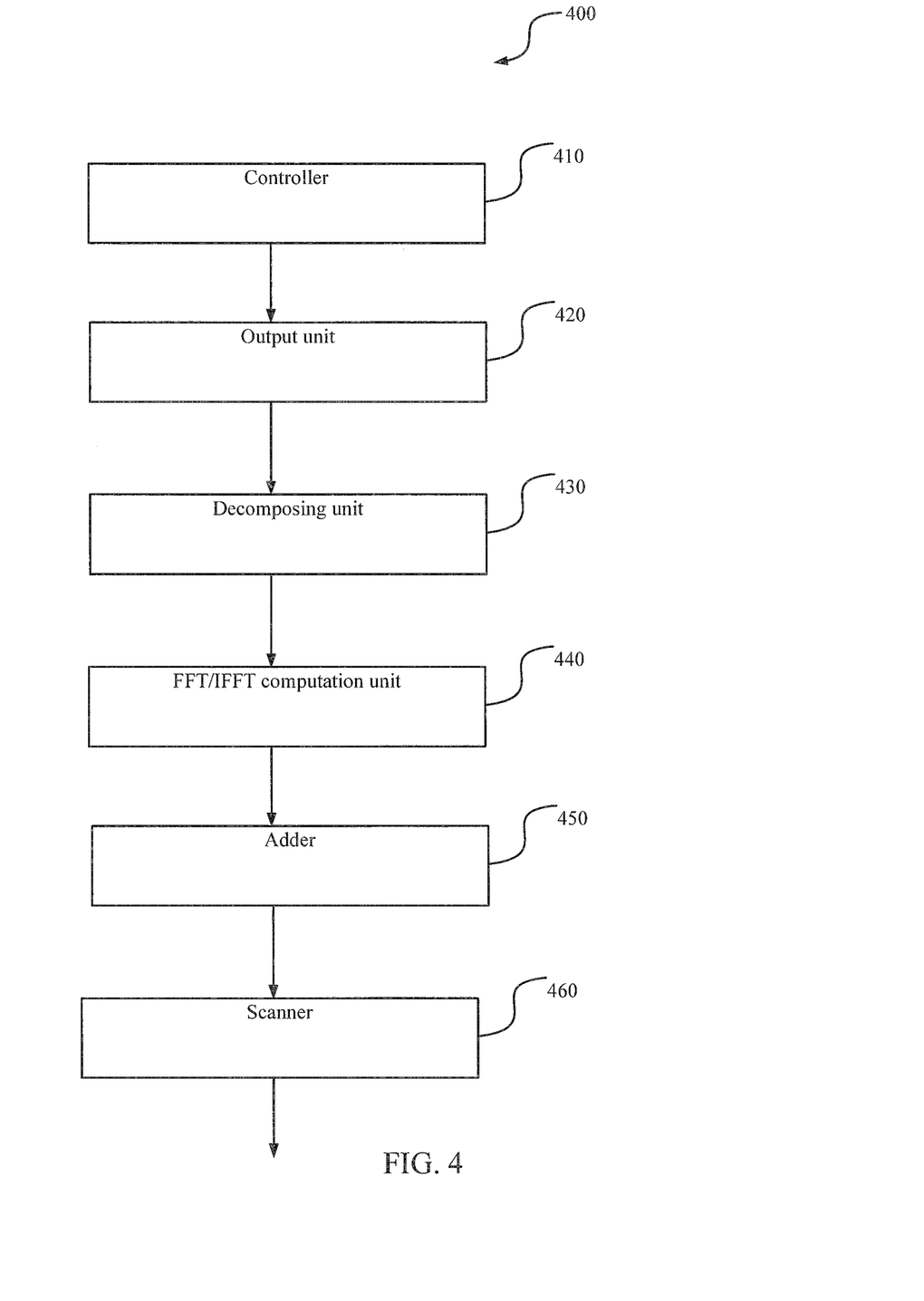
FIG. 4 is a diagram illustrating a device according to an embodiment of the invention.

FIG. 4 is a block diagram illustrating an apparatus according to one embodiment of the present invention.

The circuit 400 may be used for Fast Fourier Transform (FFT) or Inverse Fast Fourier Transform (IFFT). The circuit 400 comprises a controller 410, an output unit 420, a decomposing unit 430, a FFT/IFFT computation unit 440, an adder 450 and a scanner 460.

The controller 410 identifies whether grouping data is needed based on data bitwidth distribution in a set of data, wherein the set of data includes data in a stage of a FFT/IFFT computation. The controller 410 assigns different data representations including effective bit and group index for data identified in different groups, if grouping the data is needed, wherein data in a group have same exponent, and data in different groups have different exponents. The outputting unit 420 outputs a signal indicating the exponent.

For each of a plurality of short sequence FFT/IFFT computation, the circuit 400 further comprises the decomposing unit 430, which decomposes data used in present short sequence FFT/IFFT computation into at least a first multi-bit part and a second multi-bit part, with the first multi-bit part higher than the second multi-bit; the FFT/IFFT computation unit 440 which respectively calculates FFT/IFFT computation results for the first multi-bit part and the second multi-bit part. The adder 450 adds the FFT/IFFT computation results for the first multi-bit part and the second multi-bit part. The scanner 460 scans a plurality of added short sequence FFT/IFFT computation results, wherein the plurality of short sequence FFT/IFFT computation comprises FFT/IFFT computation in a stage.

Alternatively, the outputting unit 420 further outputs at least a bit to represent the group index if grouping the data is needed, wherein the group index indicates which exponent the group uses.

Alternatively, the controller 410 further determines a number of bits needed to represent the group index based on a number of groups.

Alternatively, the controller 410 further assigns, additional sign bit, additional sign bit generated from shifting, or reserved storage space, for storing the group index.

Alternatively, the controller 410 further represents the data with fixed-length effective bits if grouping the data is not needed, wherein the data does not use bits for group index.

Alternatively, the controller 410 further determines whether the data used in the present short sequence FFT/IFFT computation needs to be decomposed by determining whether the data in the present FFT/IFFT computation use same exponent; and the decomposing unit 430 further linearly decomposes the data used in the present short sequence FFT/IFFT computation into the first multi-bit part and the second multi-bit part if the data used in the present short sequence FFT/IFFT computation needs to be decomposed. When there is no need for decomposition, the decomposing unit 430 does not perform any operation.

Alternatively, the FFT/IFFT computation unit 440 further directly calculates present short sequence FFT/IFFT computation result if the data used in the present short sequence FFT/IFFT computation do not need to be decomposed.

Alternatively, the controller 410 identifies that grouping the data is needed further comprises: the controller 410 determines the number of groups by determining whether the addition of the number of data whose bitwidth exceeds a first predetermined threshold and whether the number of groups exceeds a second predetermined threshold based on the scanned results.

Alternatively, the controller 410 further adjusts gains for different groups of data based on their respective exponents of different groups if grouping the data is needed.

Alternatively, the scanner 460 further scans the plurality of added FFT/IFFT computation results, to determine a data bitwidth of the added FFT/IFFT computation results, and further obtain data distribution of the added FFT/IFFT computation results.

Alternatively, the decomposing unit 430 decomposes the data used in present short sequence FFT/IFFT computation into the at least first multi-bit part and the second multi-bit part according to the equation $D=A*2\hat{}k+B$, wherein A represents the first multi-bit part, B represents the second multi-bit part, and k represents the power of the first multi-bit part.

Alternatively, the FFT/IFFT computation unit 440 respectively calculates FFT/IFFT computation result for the first multi-bit part and the second multi-bit.

Alternatively, the adder 450 further adds the FFT/IFFT computation results for the first multi-bit part and the second multi-bit part by using the equation $D'=A'*2\hat{}k+B'$, wherein A' represents the FFT/IFFT computation results for the first multi-bit part, and B' represents the FFT/IFFT computation results for the second multi-bit part.

Alternatively, the scanner 460 further scans the plurality of the added short sequence FFT/IFFT computation results in a stage comprises obtaining a data distribution of a current stage of a plurality of the FFT/IFFT computation results. The controller 410, the output unit 420, the decomposing unit 430, the FFT/IFFT computation unit 440, the adder 450 and the scanner 460 iteratively perform their respective operation, until all stages of FFT/IFFT computation results have been completed.

Figure 5:
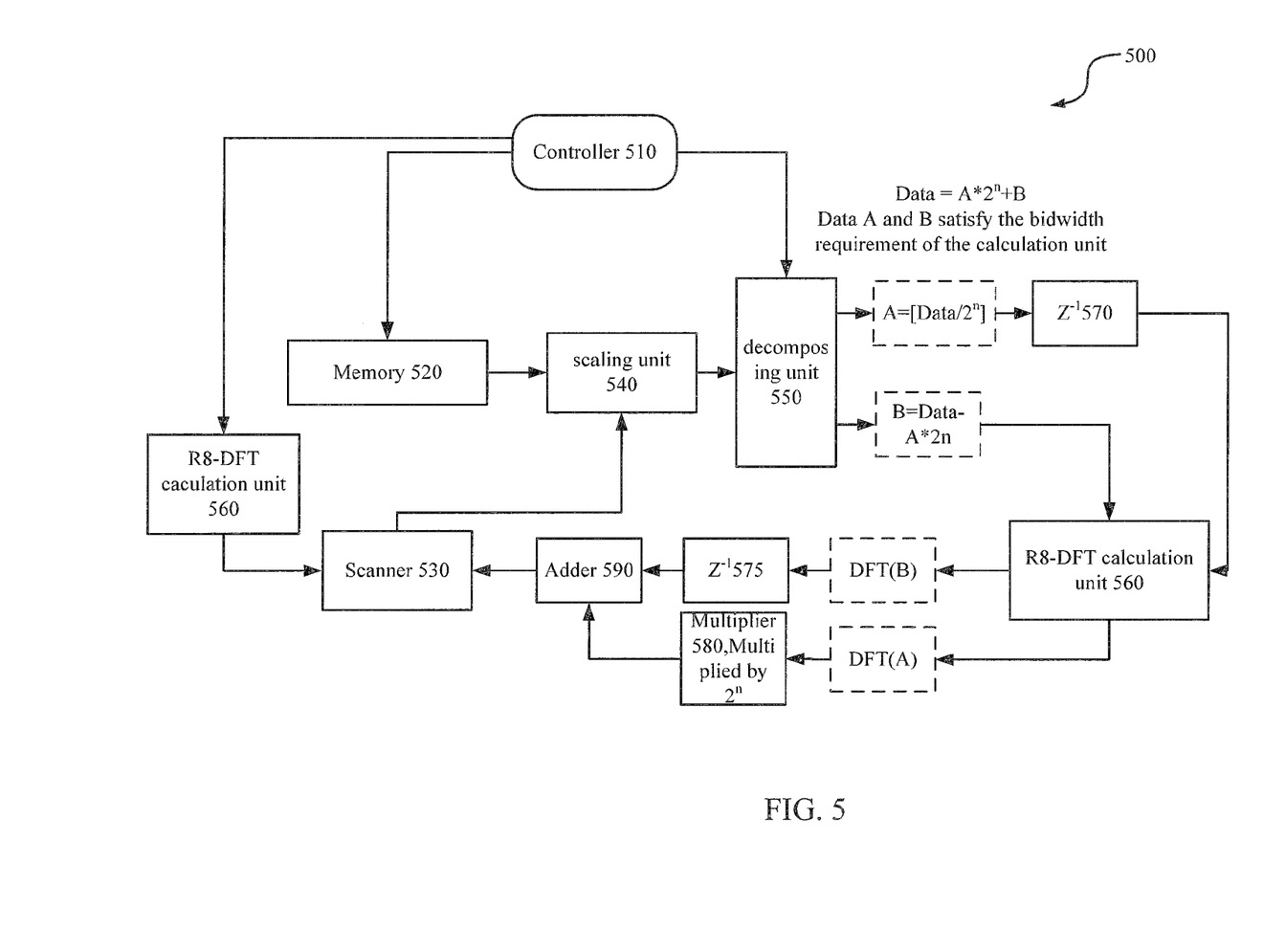
FIG. 5 is a diagram illustrating a device according to another embodiment of the invention.

FIG. 5 is a diagram illustrating a device according to another embodiment of the invention. The circuit 500 in FIG. 5 includes a controller 510, a memory 520, a scanner 530, a scaling unit 540, a decomposing unit 550, a delay unit 570 ($Z^{-1}$), to 8-radix DFT calculation unit 560, a delay unit 575 ($Z^{-1}$).

First, the controller 510 reads data in the memory 520, and determines whether the data for a butterfly DFT computing needs to be decomposed. If decomposition is needed, the data is fed to the decomposing unit 550. If decomposition is not needed, then the data is directly fed into the R8-DFT calculation unit 560. If the input is fed to the decomposition unit 550, the decomposition unit 550 decomposes the data into two parts A and B. $A=Data/2^n$, $B=Data-A\times2^n$. Data B directly enters R8-DFT calculation unit 560 for DFT calculation, and the calculation result is DFT (B). Data A is delayed by the delay unit 570, and then enters the R8-DFT calculation unit 560 for DFT calculation, and the calculation result is DFT (A). Of course, the above sequence is only for illustration. It also works to first carry out DFT calculations for the data A, and then perform DFT calculation for data B. Then, the multiplier 580 is used to multiply the calculation result DFT (A) by $2^n$, and the delay unit 575 is used to delay the calculation result DFT (B). Then, the adder 590 adds the delayed DFT (B) and the calculation result of DFT (A) multiplied by $2^n$. Then, the scanner 530 scans the calculation result, including the results through the decomposition unit 550 to the adder 590, as well as the direct result through DFT calculation unit 560. Then scaling unit 540 scales the data based on the scanned results by the scanner 530, and represents multiple data in the form of exponent and fixed-points (mantissa) approach. According to an embodiment of the invention, the number of exponent is less than the number of data, thereby reducing the computational complexity. In addition, that the number of index is less than the number of data means that at least some of the data share index, thus saving storage space for index.

Although not shown in the drawings, embodiments of the present invention further include a signal generator or the receiver comprising the circuit 400 of FIG. 4 or circuit 500 of FIG. 5.

Embodiments of the present invention compensate for defects of obvious errors in the presence of non-uniform data distribution or non-uniform data distribution generated in the iterative process. The embodiments are different from the floating-point algorithm which requires many resources. Example embodiments of the present invention have the following features:

Calculation accuracy may be greatly improved. Calculation accuracy in the calculation of the single frequency or the narrowband signal spectrum declines very slowly compared to precision when calculating randomly and uniformly distributed data. By simulating Orthogonal Frequency Division Multiplexing (OFDM) data with large narrowband interference, FFT output accuracy only drops 15 dB compared to computing uniformly and randomly distributed data.

Stable operation range of FFT may be greatly increased, and mainly improves performance for OFDM data demodulation with co-channel interference (CCI), multi-carrier time-domain channel estimation, quantization noise estimation for Analog-Digital Conversion (ADC). Enhanced operational accuracy is equivalent to the accuracy of the existing automatic gain mode increased by 2~3 bit data bitwidth.

The present solution degrades to the same design accuracy as automatic gain controller when data is evenly distributed. This ensures that the calculation precision is not less than the original design regardless of the circumstances.

Regarding resource consumptions, embodiments of the present invention utilize homogeneity and additivity of linear system, i.e., reuse original arithmetic unit without increasing major logic resource consumption. It has simple architecture and clear modules, and there is no complex encoding and decoding process which are required by the addition and subtraction arithmetic in floating-point calculation. No additional memory cell is needed. The major cost is a set of adders and a small amount of additional computation time.

The present invention improves the dynamic range of the data, and enables the iteration with a simple arithmetic unit. The first aspect of the present invention is grouping data, and a plurality of common index systems. Practical implementation can specify 2 to 5 groups. Experimental analysis shows two groups will fully meet the requirements. Of course, the more groups, the more obvious the effect, however, the marginal effect reduces.

Although the present invention has been described with reference to specific exemplary embodiments, the present invention is not limited to the embodiments described herein, and it can be implemented in form of modifications or alterations without deviating from the spirit and scope of the appended claims. Accordingly, the description and the drawings are to be regarded in an illustrative rather than a restrictive sense.

From the foregoing, it will be appreciated that specific embodiments of the technology have been described herein for purposes of illustration, however various modifications can be made without deviating from the spirit and scope of the present invention. Accordingly, the present invention is not restricted except in the spirit of the appended claims.

Other variations to the disclosed embodiments can be understood and effected by those of ordinary skill in the art in practicing the claimed invention, from a study of the drawings, the disclosure, and the appended claims. In the claims the word "comprising" does not exclude other elements or steps, and the indefinite article "a" or "an" does not exclude a plurality. Even if particular features are recited in different dependent claims, the present invention also relates to the embodiments including all these features. Any reference signs in the claims should not be construed as limiting the scope.

Features and aspects of various embodiments may be integrated into other embodiments, and embodiments illustrated in this document may be implemented without all of the features or aspects illustrated or described. One of ordinary skill in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

I claim:

1. A method for Fast Fourier Transform/Inverse Fast Fourier Transform (FFT/IFFT) computation, comprising:
    identifying whether grouping data is needed based on data bitwidth distribution in a set of data, wherein the set of data includes data in a stage of a FFT/IFFT computation;
    assigning different data representations including effective bit and group index for data identified in different groups, if grouping the data is needed, wherein data in a group have same exponent, and data in different groups have different exponents; and
    outputting a signal indicating the exponent;
    for each of a plurality of short sequence FFT/IFFT computation
        decomposing data used in present short sequence FFT/IFFT computation into at least a first multi-bit part and a second multi-bit part, with the first multi-bit part higher than the second multi-bit;
        respectively calculating FFT/IFFT computation results for the first multi-bit part and the second multi-bit part;
        adding the FFT/IFFT computation results for the first multi-bit part and the second multi-bit part;
    scanning a plurality of short sequence FFT/IFFT computation added results, wherein the plurality of short sequence FFT/IFFT computation comprises FFT/IFFT computation in a stage.

2. The method of claim 1, wherein outputting the signal indicating the exponent further comprises:
    outputting at least a bit to represent the group index if grouping the data is needed, wherein the group index indicates which exponent the group uses.

3. The method of claim 2, further comprising:
    determining a number of bits needed to represent the group index based on a number of groups.

4. The method of claim 2, further comprising:
    assigning, additional sign bit, additional sign bit generated from shifting, or reserved storage space, for storing the group index.

5. The method of claim 1, further comprising:
    representing the data with fixed-length effective bits if grouping the data is not needed, wherein the data does not use bits for group index.

6. The method of claim 1, further comprising:
    determining whether the data used in the present short sequence FFT/IFFT computation needs to be decomposed by determining whether the data in the present FFT/IFFT computation use same exponent;
the method further comprises:
linearly decomposing the data used in the present short sequence FFT/IFFT computation into the first multi-bit part and the second multi-bit part if the data used in the present short sequence FFT/IFFT computation needs to be decomposed.

7. The method of claim 6, further comprising:
directly calculating present short sequence FFT/IFFT computation result if the data used in the present short sequence FFT/IFFT computation do not need to be decomposed.

8. The method of claim 1, wherein identifying that grouping the data is needed further comprises:
determining the number of groups by determining whether the addition of the number of data whose bitwidth exceeds a first predetermined threshold and whether the number of groups exceeds a second predetermined threshold based on the scanned results.

9. The method of claim 1, further comprising:
adjusting gains for different groups of data based on their respective exponents of different groups if grouping the data is needed.

10. The method of claim 1, wherein scanning the plurality of added FFT/IFFT computation results further determines a data bitwidth of the added FFT/IFFT computation results and further obtains data distribution of the added FFT/IFFT computation results.

11. The method of claim 1, wherein decomposing the data used in present short sequence FFT/IFFT computation into the at least first multi-bit part and the second multi-bit part is implemented according to the equation $D=A*2^k+B$, wherein A represents the first multi-bit part, B represents the second multi-bit part, and k represents the power of the first multi-bit part.

12. The method of claim 11, wherein
respectively calculating FFT/IFFT computation result for the first multi-bit part and the second multi-bit further comprises
respectively calculating FFT/IFFT computation result for the first multi-bit part and the second multi-bit by reusing a same FFT/IFFT computation unit.

13. The method of claim 12, further comprises
adding the FFT/IFFT computation results for the first multi-bit part and the second multi-bit part by using the equation $D'=A'*2^k+B'$, wherein A' represents the FFT/IFFT computation results for the first multi-bit part, and B' represents the FFT/IFFT computation results for the second multi-bit part.

14. The method of claim 1, wherein
scanning the plurality of the short sequence FFT/IFFT computation added results in a stage comprises obtaining a data distribution of a current stage of a plurality of the FFT/IFFT computation results;
the method further comprises:
iteratively performing the following items, until all stages of FFT/IFFT computation results have been completed:
identifying whether grouping data is needed based on data bitwidth distribution in the set of data, wherein the set of data includes data in a stage of a FFT/IFFT computation;
assigning different data representations including effective bit and group index for data identified in different groups, if grouping the data is needed, wherein data in a group have same exponent, and data in different groups have different exponents; and outputting a signal indicating the exponent;
for each of a plurality of short sequence FFT/IFFT computation
decomposing data used in present short sequence FFT/IFFT computation into at least a first multi-bit part and a second multi-bit part, with the first multi-bit part higher than the second multi-bit;
respectively calculating FFT/IFFT computation results for the first multi-bit part and the second multi-bit part;
adding the FFT/IFFT computation results for the first multi-bit part and the second multi-bit part;
scanning a plurality of added short sequence FFT/IFFT computation results, wherein the plurality of short sequence FFT/IFFT computation comprises FFT/IFFT computation in a stage.

15. A circuit for Fast Fourier Transform/ Inverse Fast Fourier Transform (FFT/IFFT) computation, comprising:
a controller configured to identify whether grouping data is needed based on data bitwidth distribution in a set of data, wherein the set of data includes data in a stage of a FFT/IFFT computation;
assigning different data representations including effective bit and group index for data identified in different groups, if grouping the data is needed, wherein data in a group have same exponent, and data in different groups have different exponents; and
outputting unit, configured to output a signal indicating the exponent;
for each of a plurality of short sequence FFT/IFFT computation
a decomposing unit configured to decompose data used in present short sequence FFT/IFFT computation into at least a first multi-bit part and a second multi-bit part, with the first multi-bit part higher than the second multi-bit;
a FFT/IFFT computation unit, configured to respectively calculate FFT/IFFT computation results for the first multi-bit part and the second multi-bit part;
an adder configured to add the FFT/IFFT computation results for the first multi-bit part and the second multi-bit part;
a scanner, configured to scan a plurality of added short sequence FFT/IFFT computation results, wherein the plurality of short sequence FFT/IFFT computation comprises FFT/IFFT computation in a stage.

16. The circuit of claim 15, wherein the outputting unit is further configured to
output at least a bit to represent the group index if grouping the data is needed, wherein the group index indicates which exponent the group uses.

17. The circuit of claim 16, wherein the controller is further configured to
determine a number of bits needed to represent the group index based on a number of groups.

18. The circuit of claim 16, wherein the controller is further configured to
assign, additional sign bit, additional sign bit generated from shifting, or reserved storage space, for storing the group index.

19. The circuit of claim 15, wherein the controller is further configured to
represent the data with fixed-length effective bits if grouping the data is not needed, wherein the data does not use bits for group index.

20. The circuit of claim 15, wherein the controller is further configured to determine whether the data used in the present short sequence FFT/IFFT computation needs to be decomposed by determining whether the data in the present FFT/IFFT computation use same exponent;

the decomposing unit is further configured to linearly decompose the data used in the present short sequence FFT/IFFT computation into the first multi-bit part and the second multi-bit part if the data used in the present short sequence FFT/IFFT computation needs to be decomposed.

21. The circuit of claim 20, wherein the FFT/IFFT computation unit is further configured to directly calculate present short sequence FFT/IFFT computation result if the data used in the present short sequence FFT/IFFT computation do not need to be decomposed.

22. The circuit of claim 15, wherein identifying that grouping the data is needed further comprises:

determining the number of groups, by determining whether the addition of the number of data whose bitwidth exceeds a first predetermined threshold and whether the number of groups exceeds a second predetermined threshold based on the scanned results.

23. The circuit of claim 15, wherein the controller is further configured to adjust gains for different groups of data based on their respective exponents of different groups if grouping the data is needed.

24. The circuit of claim 15, wherein the scanner is further configured to scan the plurality of added FFT/IFFT computation results, to determine a data bitwidth of the added FFT/IFFT computation results, and further obtain data distribution of the added FFT/IFFT computation results.

25. The circuit of claim 15, wherein the decomposing unit decomposes the data used in present short sequence FFT/IFFT computation into the at least first multi-bit part and the second multi-bit part according to the equation $D=A*2^k+B$, wherein A represents the first multi-bit part, B represents the second multi-bit part, and k represents the power of the first multi-bit part.

26. The circuit of claim 25, wherein the FFT/IFFT computation unit respectively calculates FFT/IFFT computation result for the first multi-bit part and the second multi-bit.

27. The circuit of claim 26, wherein the adder is further configured to add the FFT/IFFT computation results for the first multi-bit part and the second multi-bit part by using the equation $D'=A'*2^k+B'$, wherein A' represents the FFT/IFFT computation results for the first multi-bit part, and B' represents the FFT/IFFT computation results for the second multi-bit part.

28. The circuit of claim 15, wherein the scanner is further configured to scan the plurality of the added short sequence FFT/IFFT computation results in a stage comprises obtaining a data distribution of a current stage of a plurality of the FFT/IFFT computation results;

the controller, the output unit, the decomposing unit, the FFT/IFFT computation unit, the adder and the scanner iteratively perform their respective operation, until all stages of FFT/IFFT computation results have been completed.

29. A signal generator, including the circuit of claim 15.

30. A receiver, including the circuit of claim 15.

* * * * *